United States Patent
Giladi

(10) Patent No.: US 11,663,688 B2
(45) Date of Patent: May 30, 2023

(54) COLLUSION ATTACK PREVENTION

(71) Applicant: Comcast Cable Communications, LLC, Philadelphia, PA (US)

(72) Inventor: Alexander Giladi, Princeton, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 105 days.

(21) Appl. No.: 17/154,657

(22) Filed: Jan. 21, 2021

(65) Prior Publication Data

US 2021/0350494 A1 Nov. 11, 2021

Related U.S. Application Data

(63) Continuation of application No. 16/041,177, filed on Jul. 20, 2018, now Pat. No. 10,937,117.

(51) Int. Cl.
*G06K 9/00* (2022.01)
*G06T 1/00* (2006.01)
*H04N 19/124* (2014.01)
*H04N 19/593* (2014.01)
*H04N 19/513* (2014.01)

(52) U.S. Cl.
CPC ............ G06T 1/005 (2013.01); G06T 1/0085 (2013.01); *G06T 2201/0051* (2013.01); *G06T 2201/0052* (2013.01); *G06T 2201/0061* (2013.01); *G06T 2201/0063* (2013.01); *H04N 19/124* (2014.11); *H04N 19/513* (2014.11); *H04N 19/593* (2014.11)

(58) Field of Classification Search
CPC ................... G06T 1/005; G06T 1/0085; G06T 2201/0052; G06T 2201/0051; H04N 19/124; H04N 19/513; H04N 19/593
USPC ......................................................... 382/100
See application file for complete search history.

(56) References Cited

U.S. PATENT DOCUMENTS

| | | | |
|---|---|---|---|
| 10,937,117 B2* | 3/2021 | Giladi | G06T 1/0085 |
| 11,303,975 B2* | 4/2022 | Giladi | H04N 21/8456 |
| 2009/0136026 A1 | 5/2009 | Celik | |
| 2010/0046606 A1* | 2/2010 | Celik | G06T 1/0085 713/176 |
| 2011/0161086 A1 | 6/2011 | Rodriguez | |
| 2014/0086445 A1 | 3/2014 | Brubeck et al. | |
| 2016/0050468 A1* | 2/2016 | Morten | H04N 21/44016 725/28 |
| 2016/0345079 A1 | 11/2016 | Salishev et al. | |
| 2016/0364826 A1 | 12/2016 | Wang et al. | |
| 2017/0109858 A1 | 4/2017 | Jiang et al. | |
| 2018/0352307 A1* | 12/2018 | Giladi | G06F 21/16 |
| 2018/0357742 A1* | 12/2018 | Henry | H04N 21/8358 |
| 2019/0068673 A1* | 2/2019 | Giladi | H04L 65/762 |
| 2019/0279330 A1* | 9/2019 | Kim | G06T 1/0021 |
| 2020/0014988 A1* | 1/2020 | Navali | H04N 21/234309 |

\* cited by examiner

*Primary Examiner* — Marceau Milord

(74) *Attorney, Agent, or Firm* — Ballard Spahr LLP

(57) ABSTRACT

Systems and methods are described for obfuscating variants of content segments. Variants of content segments can be used to encode an identifying sequence in a transmission of content. The variants of the content segments can each include one or more marked frames and one or more unmarked frames. Variations can be introduced into the unmarked frames for each of the variants of the content segments.

26 Claims, 6 Drawing Sheets

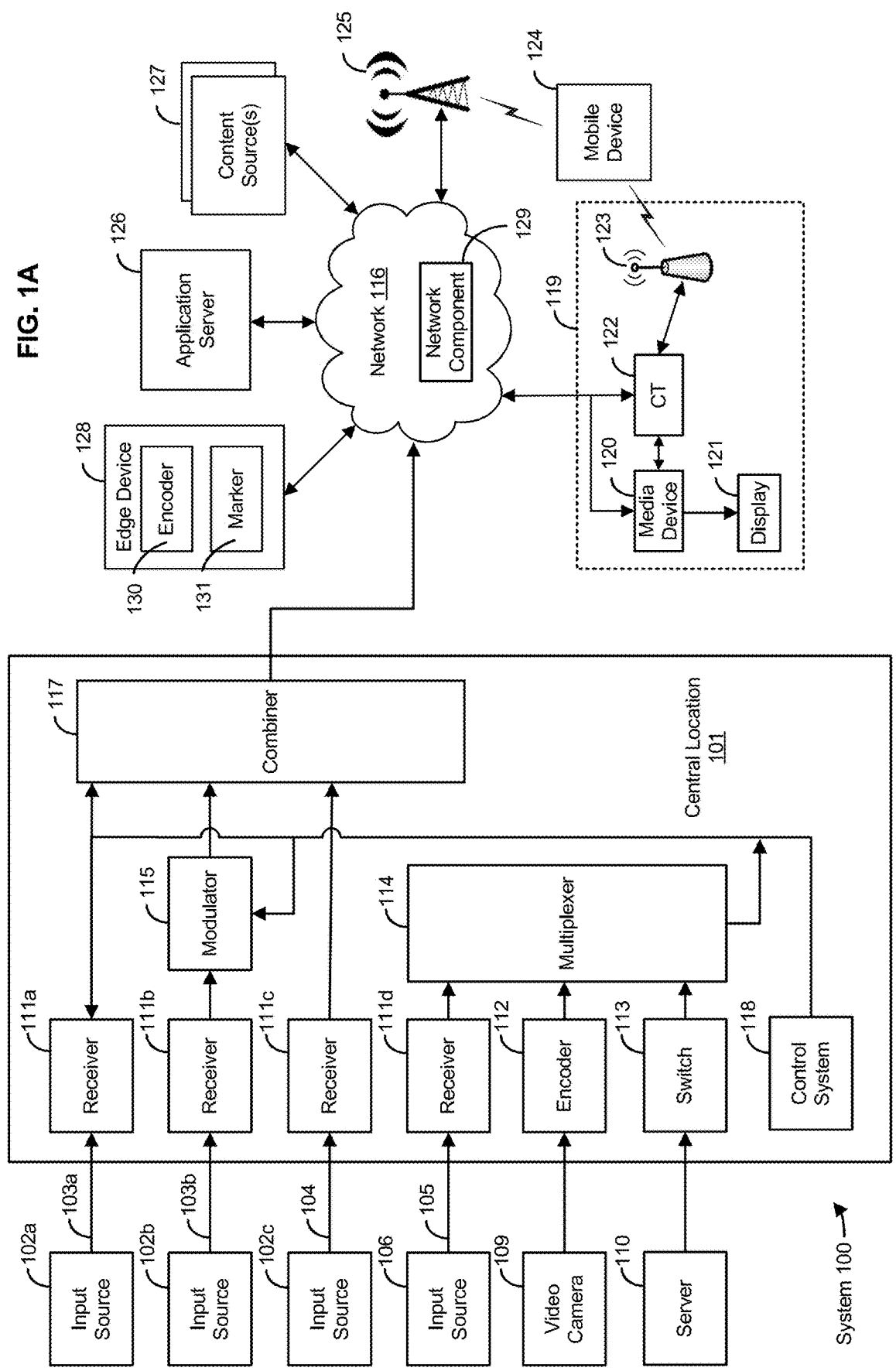

| B(i) | B(i+1) | B(i+2) | A(i+3) | ... |

150b

| B(i) | ... | B(N+i) | ... | B(2N+i) | ... | A(3N+i) | ... |

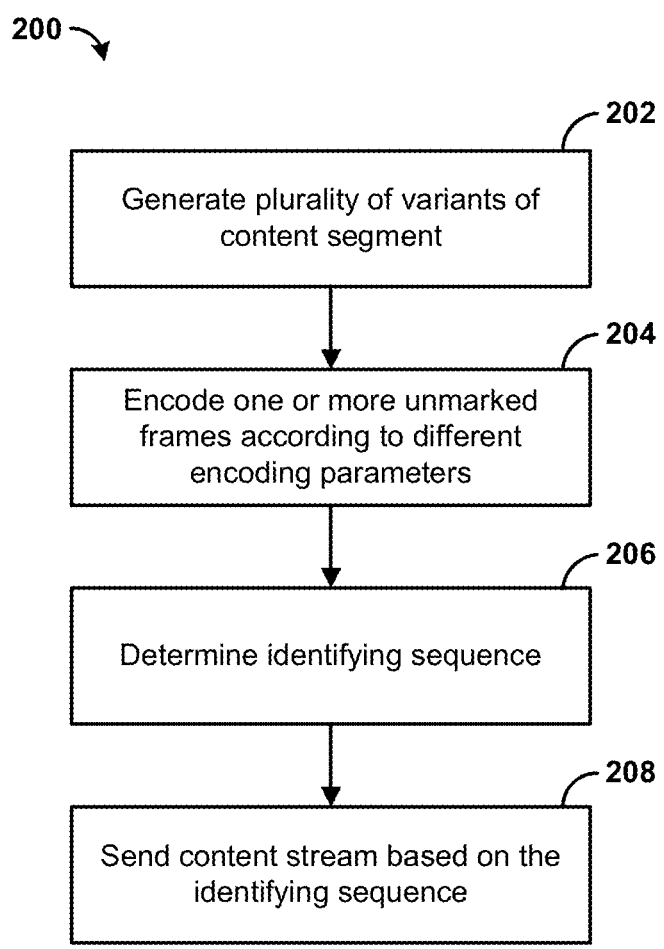

COLLUSION ATTACK PREVENTION

CROSS REFERENCE TO RELATED PATENT APPLICATION

This application is a continuation of U.S. application Ser. No. 16/041,177 filed Jul. 20, 2018, which is herein incorporated by reference in its entirety.

BACKGROUND

Forensic steganography, or "watermarking," can be used to encode identifiers into a content transmission. The encoded identifiers serve to identify a source of the content transmission, or a user or device requesting the content transmission. Watermarking is typically implemented by using a sequence of variants of content segments in the content transmission. A variant of a content segment is a different version of a same content segment. A malicious user who is able to identify the use of these variants of content segments may be able to compromise the watermarking.

SUMMARY

It is to be understood that both the following general description and the following detailed description are exemplary and explanatory only and are not restrictive. Provided are methods and systems for content segment variant obfuscation. A request for content can be received. The content can be encoded as a plurality of content segments. At least a subset of the plurality of content segments can each correspond to a plurality of variants. A variant of a content segment can be a different version of a same content segment. Two variants of the same content segment can correspond to the same two seconds of content. The variants can differ in some respect that is visually imperceptible to a user, but a computer program can nonetheless differentiate between the variants, even after transcoding, camcording, geometric distortions, etc. Every Nth content segment may have a first variant, e.g., an "A" variant and a second variant, e.g., a "B" variant. An identifying sequence can be encoded into a transmission of the content as a sequence of "A" or "B" variants of content segments.

In many systems it is sufficient to have an "A"/"B" pair only for a subset of content segments (e.g., 20% of content segments). This means that across multiple sessions 80% of content segments will be bitwise identical, and 20% will have difference. This enables a collusion attack. A collusion attack can be performed by recording all content segments of a session and identifying all watermarked segments. Then it is possible to significantly degrade the watermark by changing some of the content segments that are different across multiple sessions. This may preserve watermarking but make it unsuitable for precise identification of a session.

To prevent a collusion attack, small modifications to unmarked frames can be made. The modifications can include an encoder modifying one or more macroblocks to a segment, or changing one or more quantization coefficients. The result prevents a collusion attack by making every frame appear to be computationally different across sessions, making it impossible to determine which frames are different due to inclusion in the watermarking scheme, and which frames are different due to the differences introduced above.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, show embodiments and together with the description, serve to explain the principles of the methods and systems:

FIG. 1A is a block diagram of a content distribution network;

FIG. 1B is a diagram for encoding an identifying sequence in content;

FIG. 2 is a flowchart of a method;

DETAILED DESCRIPTION

Figure 3:
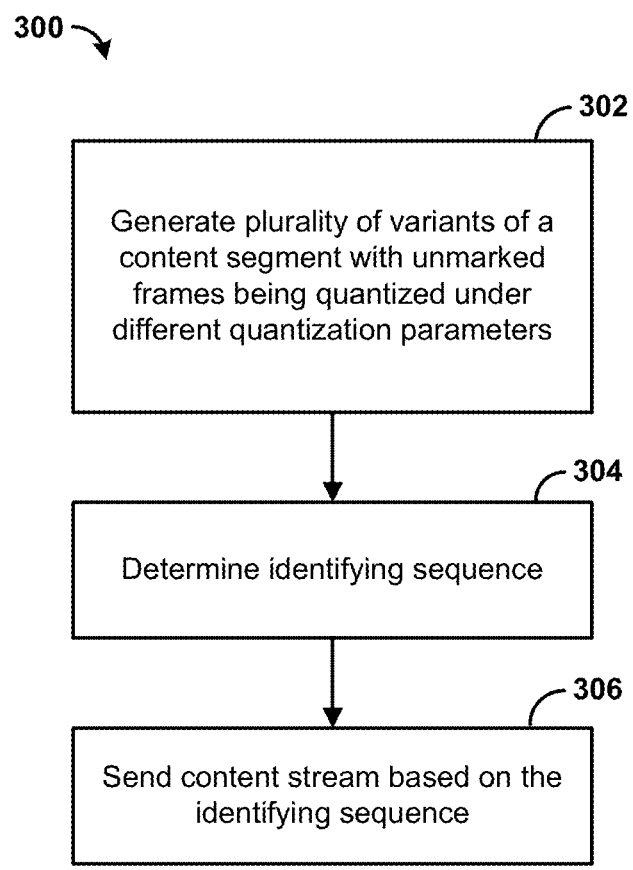
FIG. 3 is a flowchart of a method.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. When values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. The present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowcharts of methods, systems, apparatuses and computer program products. It will be understood that each block of the block diagrams and flowcharts, and combinations of blocks in the block diagrams and flowcharts, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Blocks of the block diagrams and flowcharts support combinations of means for performing the specified functions, combinations of steps for performing the specified functions and program instruction means for performing the specified functions. It will also be understood that each block of the block diagrams and flowcharts, and combinations of blocks in the block diagrams and flowcharts, can be implemented by special purpose hardware-based computer systems that perform the specified functions or steps, or combinations of special purpose hardware and computer instructions.

In various instances, this detailed description may refer to content items (which may also be referred to as "content," "content data," "content information," "content asset," "multimedia asset data file," or simply "data" or "information"). In some instances, content items can comprise any information or data that may be licensed to one or more individuals (or other entities, such as business or group). In various embodiments, content may include electronic representations of video, audio, text and/or graphics, which may include but is not limited to electronic representations of videos, movies, or other multimedia, which may include but is not limited to data files adhering to MPEG2, MPEG, MPEG4 UHD, HDR, 4 k, Adobe® Flash® Video (.FLV) format or some other video file format whether such format is presently known or developed in the future.

In various instances, this detailed description may refer to consuming content or to the consumption of content, which may also be referred to as "accessing" content, "providing" content, "viewing" content, "listening" to content, "rendering" content, or "playing" content, among other things. In some cases, the particular term utilized may be dependent on the context in which it is used. Consuming video may also be referred to as viewing or playing the video. Consuming audio may also be referred to as listening to or playing the audio.

Note that in various instances this detailed disclosure may refer to a given entity performing some action. It should be understood that this language may in some cases mean that a system (e.g., a computer) owned and/or controlled by the given entity is actually performing the action.

In the context of this description, a group of consecutive frames can be referred to as a segment, or content segment. In the context of video content distribution over an IP network, a segment can be a file or a byte range within a file that can be addressed by a client (e.g., using protocols such as Hypertext Transfer Protocol (HTTP), HTTP Secure (HTTPS), or Quick UDP Internet Connections (QUIC)), or can be conveyed to it via a broadcast/multicast protocol such as FLUTE or ROUTE. A "macroblock" can refer to macroblocks as defined in H.262 and H.264, Coding Tree Unit (CTU) and Coding Unit (CU) in H.265, as well as other block structures in different video coding standards. "Partitions" may apply to CU, Transform Unit (TU) and Prediction Unit (PU) in case of High Efficiency Video Coding (HEVC).

The present disclosure relates to obfuscation of the use of content segment variants in forensic steganography, or "watermarking." A variant of a content segment can be a different version of a same content segment. Two variants of the same content segment can correspond to the same two seconds of content. The variants can differ in some respect that is visually imperceptible to a user, but can nonetheless differentiate the variants. Different motion vectors can be used to encode a segment, or minor variations in color can be introduced.

Figure 1B:
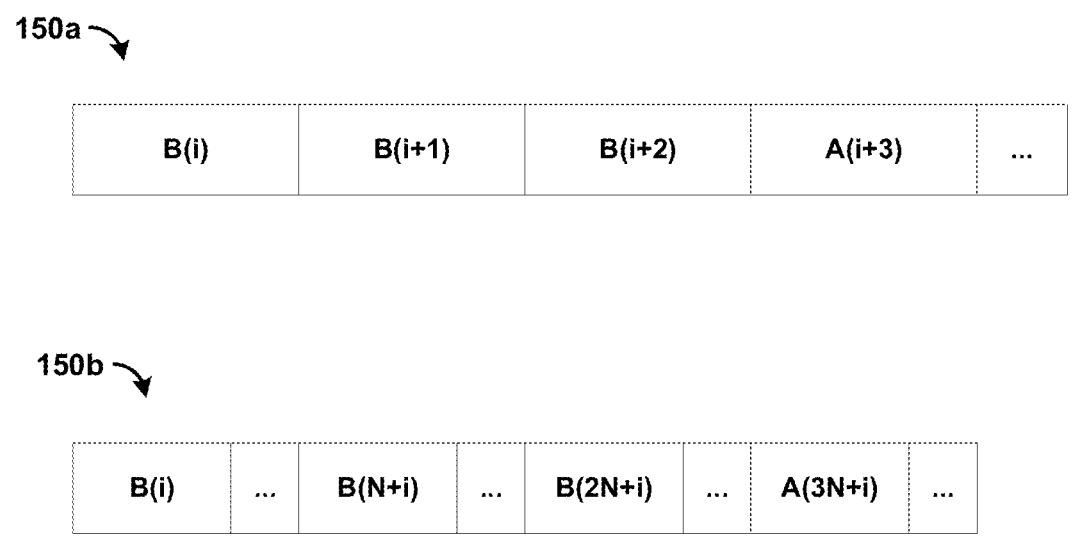

Variants of content segments can be used to encode an identifying sequence into a transmission of content. Assume content segments have both an "A" variant and a "B" variant. A variant of a content segment at index(i) can be expressed as either A(i) or B(i). An identifying sequence can then be expressed as an ordered sequence of A or B content segments. As seen in sequence 150a of FIG. 1B, an identifying sequence BBBA can be expressed beginning at index i as B(i), B(i+1), B(i+2), A(i+3). As seen in sequence 150b of FIG. 1B, the identifying sequence can be encoded into every N segments beginning at index i as B(0+i), B(N+i), B(2N+i), A(3N+i), with content segments other than the every N segments not reflecting the identifying sequence. This identifying sequence can then be encoded into a transmission of content by sending the corresponding content segment variants to a user device.

In many cases, a very small percentage of frames differ across variants (e.g., 1-2 frames per segment), or/and only some fraction (e.g., 20%) of segments has more than one variant. This means that across multiple sessions 80% of content segments will be bitwise identical, and 20% will have a difference, which may further affect less than 5% of frames. This enables a collusion attack with degradation such as mark removal. This collusion attack can be performed by recording all content segments of a session and identifying all watermarked segments. Then it is possible to significantly degrade the watermark by changing some of the content segments that are different across multiple sessions, by means such as removal of differing frames. This may still preserve parts of watermarking but make it unsuitable for precise identification of a session.

It can be assumed that an attacker has access to encrypted content segments from different sessions, but is unable to decrypt the content segments. Thus he can read and modify headers (which are unprotected in widely deployed encryption schemes. However, the attacker does not have access to the macroblock level information of the content segments in the clear. Modification of encrypted bitstreams will complicate collusion attacks as it would prevent the attacker for knowing which content segments are marked and which are not. If an attacker cannot detect which content segments or frames are unmarked it cannot remove or exchange only marked content segment and/or frames, and chances of a successful collusion attack are thus lowered.

Differences can be introduced in the unmarked frames of a content segment when operating in the uncompressed domain, e.g., modifying uncompressed content segments. One or more macroblocks of an unmarked frame in a given variant can be encoded different mode (inter vs intra, different partitions) or by using slightly different motion vectors when compared to the unmarked frames of another variant. A typical encoder evaluates a list of possible mode and motion vector decisions. If we insert an option "take the 2nd best candidate" into the rate control, then this option can be applied at different times by A and B variants (e.g. every even frame for A variant and every odd frame for B). This is significantly less complex than complete marking: the difference is a minor addition to encoder rate control logic and does not require any significant image processing. This will still be simpler than encoding twice (i.e., marking and re-encoding the complete stream).

Differences can be introduced in the unmarked frames of a content segment when operating in the compressed domain, e.g., modifying compressed content segments. When operating in the compressed domain, changes need to be applied without re-encoding as the latter would consume a significant amount of computational resources and also result in loss of quality. The only lossy part of video encoding is quantization. Quantization is followed by arithmetic coding, which is lossless and thus can be reversed and re-applied without quality impact. This means that any minor change at the arithmetic coding level will not alter the underlying video.

If changes are applied to quantized coefficients, the decoded picture will be modified, and thus introduce a mismatch between reference frame used for encoding and reference frame used for decoding. This is undesirable. However, if a quantizer is configured to apply a lesser degree of quantization and adjust the coefficients accordingly we will avoid the above mismatch. Quantization is essentially a division of a coefficient value followed by rounding. If the coefficient is divided by a smaller number, it will survive at a higher fidelity but take more bits. Thus a finer quantization will leave the same coefficients, and result in a larger amount of bits used to express the same coefficients. As a very small amount of quantizers are modified, the impact of these additional blocks on the bitrate is negligible.

FIG. 1A a system in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

A system 100 can comprise a central location 101 (e.g., a headend), which can receive content (e.g., data, input programming, and the like) from multiple sources. The central location 101 can combine the content from the various sources and can distribute the content to user (e.g., subscriber) locations (e.g., location 119) via a distribution system 116.

The central location 101 can receive content from a variety of sources 102a, 102b, 102c. The content can be transmitted from the source to the central location 101 via a variety of transmission paths, including wireless (e.g. satellite paths 103a, 103b) and a terrestrial path 104. The central location 101 can also receive content from a direct feed source 106 via a direct line 105. Other input sources can comprise capture devices such as a video camera 109 or a server 110. The signals provided by the content sources can include a single content item or a multiplex that includes several content items.

The central location 101 can comprise one or a plurality of receivers 111a, 111b, 111c, 111d that are each associated with an input source. MPEG encoders such as an encoder 112, are included for encoding local content or a video camera 109 feed. A switch 113 can provide access to the server 110, which can be a Pay-Per-View server, a data server, an interne router, a network system, a phone system, and the like. Some signals may require additional processing, such as signal multiplexing, prior to being modulated. Such multiplexing can be performed by a multiplexer (mux) 114.

The central location 101 can comprise one or a plurality of modulators 115 for interfacing to a network 116. The modulators 115 can convert the received content into a modulated output signal suitable for transmission over a network 116. The output signals from the modulators 115 can be combined, using equipment such as a combiner 117, for input into the network 116. The network 116 can comprise a content delivery network, a content access network, and/or the like. The network 116 can be configured to provide content from a variety of sources using a variety of network paths, protocols, devices, and/or the like. The content delivery network and/or content access network can be managed (e.g., deployed, serviced) by a content provider, a service provider, and/or the like.

A control system 118 can permit a system operator to control and monitor the functions and performance of the system 100. The control system 118 can interface, monitor, and/or control a variety of functions, including, but not limited to, the channel lineup for the television system, billing for each user, conditional access for content distributed to users, and the like. The control system 118 can provide input to the modulators for setting operating parameters, such as system specific MPEG table packet organization or conditional access information. The control system 118 can be located at the central location 101 or at a remote location.

The network 116 can distribute signals from the central location 101 to user locations, such as a user location 119. The network 116 can comprise an optical fiber network, a coaxial cable network, a hybrid fiber-coaxial network, a wireless network, a satellite system, a direct broadcast system, an Ethernet network, a high-definition multimedia interface network, universal serial bus network, or any combination thereof.

A multitude of users can be connected to the network 116 at one or more of the user locations. At the user location 119, a media device 120 can demodulate and/or decode, if needed, the signals for display on a display device 121, such as on a television set (TV) or a computer monitor. The media device 120 can comprise a demodulator, decoder, frequency tuner, and/or the like. The media device 120 can be directly connected to the network (e.g., for communications via in-band and/or out-of-band signals of a content delivery network) and/or connected to the network 116 via a communication terminal 122 (e.g., for communications via a packet switched network). The media device 120 can comprise a set-top box, a digital streaming device, a gaming device, a media storage device, a digital recording device, a combination thereof, and/or the like. The media device 120 can comprise one or more applications, such as content viewers, social media applications, news applications, gaming applications, content stores, electronic program guides, and/or the like. Those skilled in the art will appreciate that the signal can be demodulated and/or decoded in a variety of equipment, including the communication terminal 122, a computer, a TV, a monitor, or satellite dish.

The communication terminal 122 can be located at the user location 119. The communication terminal 122 can be configured to communicate with the network 116. The communications terminal 122 can comprise a modem (e.g., cable modem), a router, a gateway, a switch, a network terminal (e.g., optical network unit), and/or the like. The communications terminal 122 can be configured for communication with the network 116 via a variety of protocols, such as internet protocol, transmission control protocol, file transfer protocol, session initiation protocol, voice over internet protocol, and/or the like. For a cable network, the communication terminal 122 can be configured to provide network access via a variety of communication protocols and standards, such as Data Over Cable Service Interface Specification.

The user location 119 can comprise a first access point 123, such as a wireless access point. The first access point 123 can be configured to provide one or more wireless networks in at least a portion of the user location 119. The first access point 123 can be configured to provide access to the network 116 to devices configured with a compatible wireless radio, such as a mobile device 124, the media device 120, the display device 121, or other computing devices (e.g., laptops, sensor devices, security devices). The first access point 123 can provide a user managed network (e.g., local area network), a service provider managed network (e.g., public network for users of the service provider), and/or the like. It should be noted that in some configurations, some or all of the first access point 123, the communication terminal 122, the media device 120, and the display device 121 can be implemented as a single device.

The user location 119 may not be fixed. A user can receive content from the network 116 on the mobile device 124. The mobile device 124 can comprise a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like. The mobile device 124 can communicate with a variety of access points (e.g., at different times and locations or simultaneously if within range of multiple access points).

The mobile device 124 can communicate with a second access point 125. The second access point 125 can be a cell tower, a wireless hotspot, another mobile device, and/or other remote access point. The second access point 125 can be within range of the user location 119 or remote from the user location 119. The second access point 125 can be located along a travel route, within a business or residence, or other useful locations (e.g., travel stop, city center, park).

The system 100 can comprise an application device 126. The application device 126 can be a computing device, such as a server. The application device 126 can provide services related to applications. The application device 126 can comprise an application store. The application store can be configured to allow users to purchase, download, install, upgrade, and/or otherwise manage applications. The application device 126 can be configured to allow users to download applications to a device, such as the mobile device 124, communications terminal 122, the media device 120, the display device 121, and/or the like. The application device 126 can run one or more application services to provide data, handle requests, and/or otherwise facilitate operation of applications for the user.

The system 100 can comprise one or more content source(s) 127. The content source(s) 127 can be configured to provide content (e.g., video, audio, games, applications, data) to the user. The content source(s) 127 can be configured to provide streaming media, such as on-demand content (e.g., video on-demand), content recordings, and/or the like. The content source(s) 127 can be managed by third party content providers, service providers, online content providers, over-the-top content providers, and/or the like. The content can be provided via a subscription, by individual item purchase or rental, and/or the like. The content source(s) 127 can be configured to provide the content via a packet switched network path, such as via an interne protocol (IP) based connection. The content can be accessed by users via applications, such as mobile applications, television applications, set-top box applications, gaming device applications, and/or the like. An example application can be a custom application (e.g., by content provider, for a specific device), a general content browser (e.g., web browser), an electronic program guide, and/or the like.

The system 100 can comprise an edge device 128. The edge device 128 can be configured to provide content, services, and/or the like to the user location 119. The edge device 128 can be one edge device of a plurality of edge devices distributed across the network 116. The edge device 128 can be located in a region proximate to the user location 119. A request for content from the user can be directed to the edge device 128 (e.g., due to the location of the edge device and/or network conditions). The edge device 128 can be configured to package content for delivery to the user (e.g., in a specific format requested by a user device), provide the user a manifest file (e.g., or other index file describing segments of the content), provide streaming content (e.g., unicast, multicast), provide a file transfer, and/or the like. The edge device 128 can cache or otherwise store content (e.g., frequently requested content) to enable faster delivery of content to users.

The edge device 128 can include an encoder 130 and a marker 131. Although the encoder 130 and marker 131 are shown as components of the edge device 128, it is understood that the encoder 130 and marker 131 can be disposed remotely from the edge device 128. Although the encoder 130 and marker 131 are shown as separate components, it is understood that the encoder 130 can perform the functionality described by the marker 131. The encoder 130 can perform one or more encoding operations on content. The encoder 130 can generate, for given content, one or more presentations of the content each having a different bitrate. Each of the presentations of the content comprise a version of the content but encoded at a particular bitrate to facilitate variable bitrate streaming.

Content can comprise a plurality of content segments. Each of the plurality of content segments can comprise a particular duration of content, e.g., one second of content, two seconds of content, five seconds of content, and the like. Generating the one or more presentations of the content can include generating, for one or more content segments of the content, a respective bitrate presentation of the one or more content segments. Thus, a given content item having a plurality of content segments can be encoded into a plurality of presentations, each having a respective plurality of content segments. The encoder 130 can also apply compression or other transformations to the content, e.g., the plurality of content segments of the given content.

The marker 131 can generate, for a given content segment, one or more variants of the given content segment. A plurality of variants of a given content segment each express the same portion of content, e.g., a same second of content, a same two seconds of content, a same five seconds of content, and the like, but with some variation introduced to differentiate each variant. The variation can include a variation in motion vectors, color composition, audio composition, or other variation. To introduce this variation, and thereby generate a plurality of variants for a given content segment, the marker 131 can apply, to one or more frames (e.g., one or more non-reference frames), a transformation or modification. The introduced variation should be perceptible to a system attempting to identify which variation of a given content segment is being presented. Thus, the variation should remain perceptible through encoding, decoding, duplication, or other operations applied to the content segment.

Each of at least a subset of the plurality of content segments can correspond to a plurality of variants. Every Nth content segment in the plurality of content segments can correspond to a plurality of variants, while content segments outside of the every Nth content segment only have one variant. A given content segment can correspond to a first variant, or an "A" variant, and a second variant, or a "B" variant. It is understood that a given content segment can correspond to any number of variants.

The plurality of variants of the content segments can be used to generate an identifying sequence, e.g., identifying a source of a transmission of content, a session for at transmission of content, a user or user device requesting the content, a time and/or date associated with the request, the content, or data as can be appreciated. The identifier can then be expressed as an identifying sequence based on the variants of content segments. The identifier can comprise a binary value. Each 0 of the binary values can correspond to one variant, e.g., "A," while each 1 of the binary values can correspond to another variant, e.g., "B." The binary value 11001011 can be expressed as the identifying sequence BBAABABB, with each entry in the identifying sequence indicating a variant of a content segment. Thus, a given transmission of content can be "watermarked" with the identifying sequence by sending a particular sequence of variants.

Under this approach, each variant of a given content segment can comprise a plurality of marked frames and a plurality of unmarked frames. A marked frame can include the variation set forth above to differentiate each variant. The unmarked frames are typically bitwise-identical across each variant. However, this can expose a vulnerability to a collusion attack. An attacker, having access to multiple copies of a content segment from multiple sessions, can identify which frames are different across the sessions, and are therefore marked for use in the identifying sequence. This could allow the attacker to modify these identified marked frames to corrupt the watermarking.

To prevent a collusion attack, the marker 131 can introduce variations in the unmarked frames of a content segment across its variants. In other words, the unmarked frames of an "A" variant will have variations that distinguish these unmarked frames from the corresponding unmarked frames of a "B" variant. Unlike the variations used to differentiate the marked frames of variants, the variations introduced to differentiate unmarked frames need not identify a particular variant of a content segment, and therefore need not be identifiable across copying, reencoding, transcoding, recording, retransmission, or other operations. Instead, the variations used to differentiate unmarked frames of a given content segment need only make the unmarked frames of each variant bitwise different from the corresponding unmarked frames of other variants of the content segment.

The marker 131 can introduce variations in the unmarked frames of variants of a given content segment during encoding by the encoder 130. This can include encoding one or more macroblocks of an unmarked frame of a given content segment in different modes for each variant of the content segment. One or more macroblocks of an unmarked frame of a first variant of a given content segment can be encoded using inter-prediction encoding, while one or more macroblocks of a corresponding unmarked frame of a second variant of the content segment can be encoded using intra-prediction encoding.

One or more macroblocks of an unmarked frame of a first variant of a given content segment can be encoded using one or more first motion vectors, while one or more macroblocks of a corresponding unmarked frame of a second variant of the content segment can be encoded using second motion vectors different from the first motion vectors. The encoder 131 can rank one or more potential motion vectors to apply to the one or more macroblocks of the unmarked frame. The encoder 131 can be configured to select, according to the ranking, a first motion vector for the unmarked frame of the first variant and a second motion vector for the corresponding unmarked frame of the second variant. The encoder 131 can be configured to select, for even-numbered frames, a highest ranked motion vector for the unmarked frame of the first variant and a next-highest ranked motion vector for the corresponding unmarked frame of the second variant. The encoder 131 can then select, for odd-numbered frames, a highest ranked motion vector for the unmarked frame of the second variant and a next-highest ranked motion vector for the corresponding unmarked frame of the first variant.

Variations can be introduced into the unmarked frames of variants of a given content segment during quantization. A different degree of quantization can be applied to each variant of a content segment. A first degree of quantization can be applied to a first variant of the content segment, while a greater or lesser degree of quantization can be applied to a second variant of the content segment. A first variant of the content segment can be quantized using one or more first quantization coefficients, while a second variant of the content segment can be quantized using one or more second quantization coefficients different from the first quantization coefficients. If variants of a content segment are quantized using differing degrees of quantization (e.g., a first degree of quantization to a first variant of the content segment and a greater or lesser degree of quantization applied to a second variant of the content segment), the one or more first or second quantization coefficients can be determined based on the degree of quantization applied.

If variations are introduced into the unmarked frames of variants of a content segment, one or more metadata attributes of each of the variants of the content segment can be modified to ensure compliance with a Hypothetical Reference Decoder (HRD) restriction, or other standard. A stated bitrate can be modified. A Coded Picture Buffer (CPB) value can be modified. The modified stated bitrate, modified CPB value, or other attributes can be encoded into a Sequence Parameter Set (SPS) metadata value, or another metadata value.

The edge device 128 can receive a request for content, e.g. from a user device. In response to the request for content, the edge device 128 can generate an identifying sequence associated with the request. Based on the identifying sequence, the edge device 128 can generate a manifest facilitating access, e.g., by the user device, to the requested content. Generating the manifest can comprise generating a manifest comprising entries identifying content segment variants according to the identifying sequence. Given the identifying sequence BBAABABB and a starting index(i) for content segments, the edge device 128 can generate a manifest having entries for content segments as B(i), B(i+1), A(i+2), A(i+3), B(i+4), A(i+5), B(i+6), B(i+7). Given the identifying sequence BBAABABB and a starting index(i) for content segments, the edge device 128 can generate a manifest where every Nth segment corresponds to an entry in the identifying sequence, e.g., B(i), B(N+i), A(2N+i), A(3N+i), B(4N+i), A(5N+i), B(6N+i), B(7N+i).

After generating the manifest based on the identifying sequence, the manifest can be transmitted to the user device. Thus, the user device, using the manifest, requests content segment variants according to the identifying sequence.

The network 116 can comprise a network component 129. The network component 129 can comprise any device, module, and/or the like communicatively coupled to the network 116. The network component 129 can comprise a router, a switch, a splitter, a packager, a gateway, a encoder, a storage device, a multiplexer, a network access location (e.g., tap), physical link, and/or the like.

FIG. 2 is a flowchart of a method. Beginning with step 202 a plurality of variants of a content segment can be generated, e.g., by the edge device 128, encoder 130, and/or marker 131. The content segment can comprise a content segment of a plurality of content segments. Each of the plurality of content segments can comprise a particular duration of content, e.g. one second of content, two seconds of content, five seconds of content, and the like. A plurality of variants of a given content segment each represent the same portion of content, e.g., a same second of content, a same two seconds of content, a same five seconds of content, etc . . . , but with some variation introduced to differentiate each variant. Generating the plurality of variants of the content segment can include applying, to one or more frames (e.g., one or more non-reference frames), a transformation or modification, thereby introducing a variation between a marked frame of a variant of the content segment and the corresponding marked frame in the other variants of the content segment. The introduced variation should be perceptible to a system attempting to identify which variation of a given content segment is being presented. Thus, the variation should remain perceptible through encoding, decoding, duplication, or other operations applied to the content segment. Applying the transformation or modification can include modifying, for one or more of the plurality of variants, motion vectors, color composition, audio composition, or other parameters.

At step 204, one or more unmarked frames (e.g., one or more frames not modified according to the variation described in step 202) for each of the plurality of variants of the content segment are encoded according to different encoding parameters, e.g., by the edge device 128, encoder 130 and/or marker 131. In other words, the unmarked frames of an "A" variant will have variations that distinguish these unmarked frames from the corresponding unmarked frames of a "B" variant. Unlike the variations used to differentiate the marked frames of variants, the variations introduced to differentiate unmarked frames need not identify a particular variant of a content segment, and therefore need not be identifiable across copying, reencoding, transcoding, recording, retransmission, or other operations. Instead, the variations used to differentiate unmarked frames of a given content segment need only make the unmarked frames of each variant bitwise different from the corresponding unmarked frames of other variants of the content segment.

Encoding the one or more unmarked frames for each of the plurality of variants according different encoding parameters can include encoding one or more macroblocks of an unmarked frame of a given content segment in different modes for each of the plurality of variants of the content segment. One or more macroblocks of an unmarked frame of a first variant of a given content segment can be encoded using inter-prediction encoding, while one or more macroblocks of a corresponding unmarked frame of a second variant of the content segment can be encoded using intra-prediction encoding.

Encoding the one or more unmarked frames for each of the plurality of variants according different encoding parameters can include encoding one or more macroblocks of an unmarked frame of a given content segment using different motion vectors for each of the plurality of variants of the content segment. One or more macroblocks of an unmarked frame of a first variant of the content segment can be encoded using one or more first motion vectors, while one or more macroblocks of a corresponding unmarked frame of a second variant of the content segment can be encoded using second motion vectors different from the first motion vectors.

One or more potential motion vectors can be ranked. A first motion vector can be selected, according to the ranking, for the unmarked frame of the first variant and a second motion vector for the corresponding unmarked frame of the second variant. For even-numbered frames, a highest ranked motion vector can be selected for the unmarked frame of the first variant and a next-highest ranked motion vector can be selected for the corresponding unmarked frame of the second variant. For odd-numbered frames, a highest ranked motion vector can be selected for the unmarked frame of the second variant and a next-highest ranked motion vector can be selected for the corresponding unmarked frame of the first variant.

At step 206 an identifying sequence can be determined, e.g., by the edge device 128. The identifying sequence can be determined in response to a request for content, e.g. from a user device. The identifying sequence can identify a source of a transmission of the content, a session for a transmission of the content, a user or the user device requesting the content, a time and/or date associated with the request, the content, or other data as can be appreciated. The identifier can then be expressed as an identifying sequence based on the variants of content segments. The identifier can comprise a binary value. Each 0 of the binary values can correspond to one variant, e.g., "A," while each 1 of the binary values can correspond to another variant, e.g., "B." The binary value 11001011 can be expressed as the identifying sequence BBAABABB, with each entry in the identifying sequence indicating a variant of a content segment. Thus, a given transmission of content can be "watermarked" with the identifying sequence by sending a particular sequence of variants.

At step 208, a content stream based on the identifying sequence can be transmitted, e.g., by the edge device 128. Sending the content stream based on the identifying sequence can include generating a manifest based on the identifying sequence. The manifest can then be transmitted to the user device. Thus, the user device, using the manifest, requests content segment variants according to the identifying sequence.

FIG. 3 is a flowchart of a method. Beginning with step 302 a plurality of variants of a content segment can be generated, e.g., by the edge device 128, encoder 130 and/or marker 131, with one or more unmarked frames of each of each of the plurality of variants being quantized under different quantization parameters. The content segment can comprise one content segment of a plurality of content segments each comprising a particular duration of content, e.g. one second of content, two seconds of content, five seconds of content, and the like. A plurality of variants of a given content segment each express the same portion of content, e.g., a same second of content, a same two seconds of content, or a same five seconds of content, but with some variation introduced to differentiate each variant. The variation should remain perceptible through encoding, decoding, duplication, or other operations applied to the content segment. The variation can include variations in motion vectors, color composition, audio composition, or other parameters.

Quantizing the one or more unmarked frames under different quantization parameters can include applying a different degree of quantization to the unmarked frames each variant of a content segment. A first degree of quantization can be applied to a first variant of the content segment, while a greater or lesser degree of quantization can be applied to a second variant of the content segment. A first variant of the content segment can be quantized using one or more first quantization coefficients, while a second variant of the content segment can be quantized using one or more second quantization coefficients different from the first quantization coefficients. If variants of a content segment are quantized using differing degrees of quantization (e.g., a first degree of quantization to a first variant of the content segment and a greater or lesser degree of quantization applied to a second variant of the content segment), the one or more first or second quantization coefficients can be determined based on the degree of quantization applied. Unlike the variations used to differentiate the marked frames of variants, the variations introduced to differentiate unmarked frames need not identify a particular variant of a content segment, and therefore need not be identifiable across copying, reencoding, transcoding, recording, retransmission, or other operations. Instead, the variations used to differentiate unmarked frames of a given content segment need only make the unmarked frames of each variant bitwise different from the corresponding unmarked frames of other variants of the content segment.

At step 304 an identifying sequence can be determined, e.g., by the edge device 128. The identifying sequence can be determined in response to a request for content, e.g. from a user device. The identifying sequence can identify a source of a transmission of the content, a session for a transmission of the content, a user or the user device requesting the content, a time and/or date associated with the request, the content, or orther data as can be appreciated. The identifier can then be expressed as an identifying sequence based on the variants of content segments. The identifier can comprise a binary value. Each 0 of the binary values can correspond to one variant, e.g., "A," while each 1 of the binary values can correspond to another variant, e.g., "B." The binary value 11001011 can be expressed as the identifying sequence BBAABABB, with each entry in the identifying sequence indicating a variant of a content segment. Thus, a given transmission of content can be "watermarked" with the identifying sequence by sending a particular sequence of variants.

At step 308, a content stream based on the identifying sequence can be transmitted, e.g., by the edge device 128. Sending the content stream based on the identifying sequence can include generating a manifest based on the identifying sequence. The manifest can then be transmitted to the user device. Thus, the user device, using the manifest, requests content segment variants according to the identifying sequence.

Figure 4:
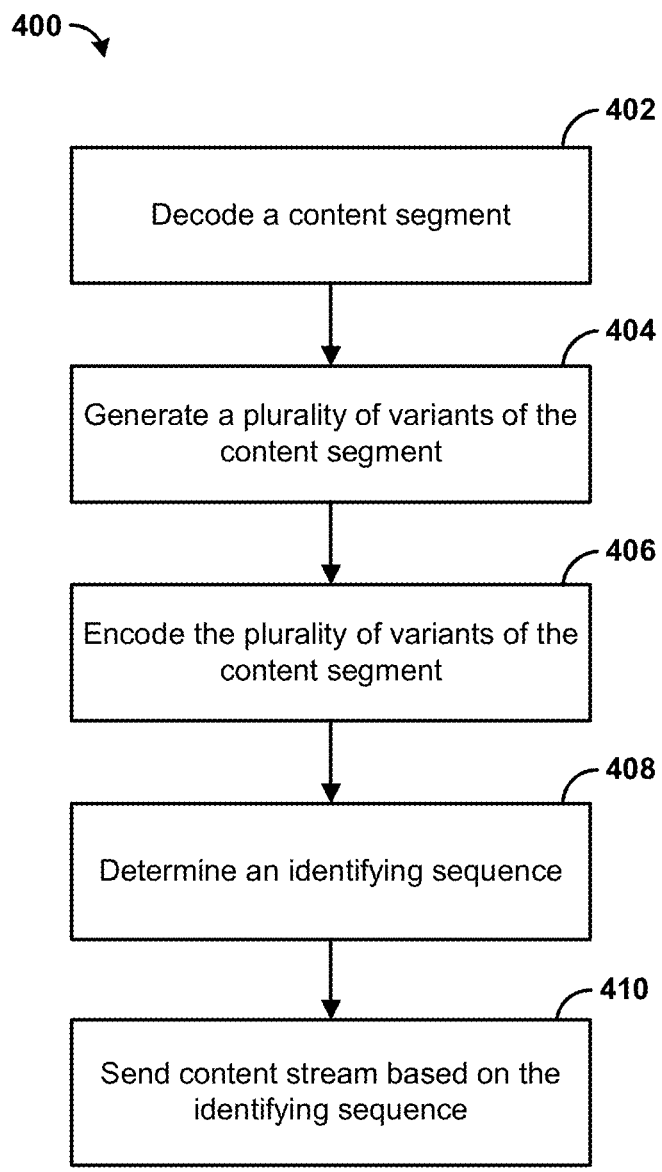
FIG. 4 is a flowchart of a method.

FIG. 4 is a flowchart of a method. Beginning with step 402, a content segment can be decoded, e.g., by the edge device 128, encoder 130 and/or marker 131. The content segment can comprise one content segment of a plurality of content segments each comprising a particular duration of content, e.g. one second of content, two seconds of content, or five seconds of content. Decoding the content segment can include decompressing, decrypting, or otherwise transforming the content segment.

At step 404, a plurality of variants of the content segment can be generated. The plurality of variants of the content segment each express the same portion of content, e.g., a same second of content, a same two seconds of content, or a same five seconds of content, but with some variation introduced in a "marked frame" to differentiate each variant. The variation should remain perceptible through encoding, decoding, duplication, or other operations applied to the content segment. The variation can include variations in motion vectors, color composition, audio composition, or other parameters.

Generating the plurality of variants can include quantizing one or more "unmarked frames," e.g., frames not having a variation introduced to facilitate identification of a particular variant, under different quantization parameters. Quantizing the one or more unmarked frames under different quantization parameters can include applying a different degree of quantization to the unmarked frames each variant of a content segment. A first degree of quantization can be applied to a first variant of the content segment, while a greater or lesser degree of quantization can be applied to a second variant of the content segment. A first variant of the content segment can be quantized using one or more first quantization coefficients, while a second variant of the content segment can be quantized using one or more second quantization coefficients different from the first quantization coefficients. If variants of a content segment are quantized using differing degrees of quantization (e.g., a first degree of quantization to a first variant of the content segment and a greater or lesser degree of quantization applied to a second variant of the content segment), the one or more first or second quantization coefficients can be determined based on the degree of quantization applied. Unlike the variations used to differentiate the marked frames of variants, the variations introduced to differentiate unmarked frames need not identify a particular variant of a content segment, and therefore need not be identifiable across copying, reencoding, transcoding, recording, retransmission, or other operations. Instead, the variations used to differentiate unmarked frames of a given content segment need only make the unmarked frames of each variant bitwise different from the corresponding unmarked frames of other variants of the content segment.

At step 406, each of the plurality of variants of the content segment can be encoded, e.g., by the encoder 130. Encoding each of the plurality of variants of the content segment can include applying compression, encryption, or other transformations to each of the plurality of variants of the content segment. Encoding each of the plurality of variants of the content segment can include generating, for each variant of the plurality of variants, a plurality of presentations (e.g., versions) of the variant each having a different bitrate.

At step 408 an identifying sequence can be determined, e.g., by the edge device 128. The identifying sequence can be determined in response to a request for content, e.g. from a user device. The identifying sequence can identify a source of a transmission of the content, a session for a transmission of the content, a user or the user device requesting the content, a time and/or date associated with the request, the content, or orther data as can be appreciated. The identifier can then be expressed as an identifying sequence based on the variants of content segments. The identifier can comprise a binary value. Each 0 of the binary values can correspond to one variant, e.g., "A," while each 1 of the binary values can correspond to another variant, e.g., "B." The binary value 11001011 can be expressed as the identifying sequence BBAABABB, with each entry in the identifying sequence indicating a variant of a content segment. Thus, a given transmission of content can be "watermarked" with the identifying sequence by sending a particular sequence of variants.

At step 410, a content stream based on the identifying sequence can be transmitted, e.g., by the edge device 128. Sending the content stream based on the identifying sequence can include generating a manifest based on the identifying sequence. The manifest can then be transmitted to the user device. Thus, the user device, using the manifest, requests content segment variants according to the identifying sequence.

Figure 5:
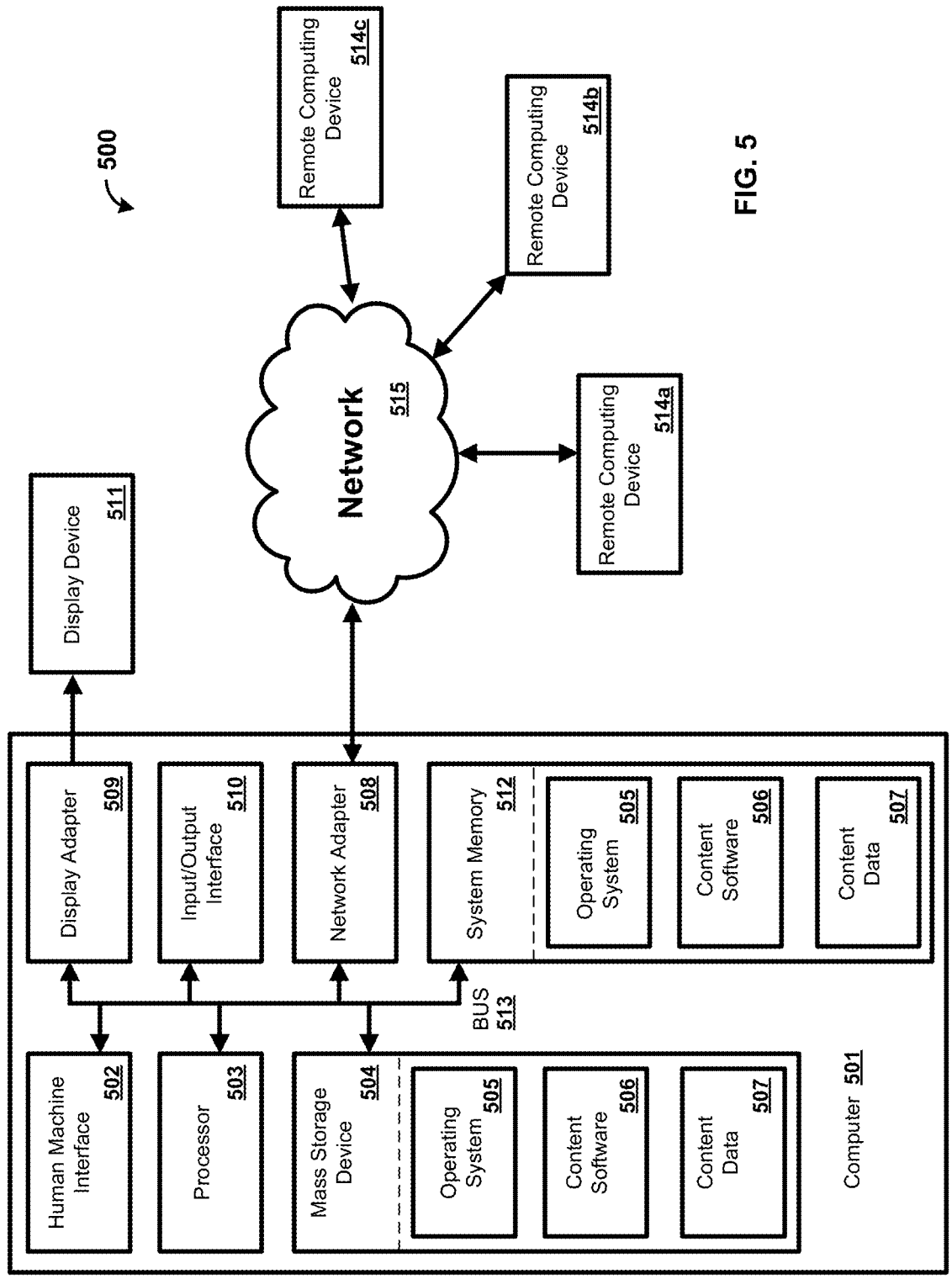
FIG. 5 is a block diagram of a computing device.

The methods and systems can be implemented on a computer 501 as shown in FIG. 5 and described below. The edge device 128 of FIG. 1A can be a computer as shown in FIG. 5. The methods and systems disclosed can utilize one or more computers to perform one or more functions in one or more locations. FIG. 5 is a block diagram showing an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components shown in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 501. The components of the computer 501 can comprise, but are not limited to, one or more processors 503, a system memory 512, and a system bus 513 that couples various system components including the one or more processors 503 to the system memory 512. The system can utilize parallel computing.

The system bus 513 represents one or more of several possible types of bus structures, including a memory bus or memory controller, a peripheral bus, an accelerated graphics port, or local bus using any of a variety of bus architectures. Such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 513, and all buses specified in this description can also be implemented over a wired or wireless network connection and each of the subsystems, including the one or more processors 503, a mass storage device 504, an operating system 505, content software 506, content data 507, a network adapter 508, the system memory 512, an Input/Output Interface 510, a display adapter 509, a display device 511, and a human machine interface 502, can be contained within one or more remote computing devices 514a,b,c at physically separate locations, connected through buses of this form, in effect implementing a fully distributed system.

The computer 501 typically comprises a variety of computer readable media. Exemplary readable media can be any available media that is accessible by the computer 501 and comprises both volatile and non-volatile media, removable and non-removable media. The system memory 512 comprises computer readable media in the form of volatile memory, such as random access memory (RAM), and/or non-volatile memory, such as read only memory (ROM). The system memory 512 typically contains data such as the content data 507 and/or program modules such as the operating system 505 and the content software 506 that are immediately accessible to and/or are presently operated on by the one or more processors 503.

The computer 501 can also comprise other removable/non-removable, volatile/non-volatile computer storage media. FIG. 1A shows the mass storage device 504 which can provide non-volatile storage of computer code, computer readable instructions, data structures, program modules, and other data for the computer 501. The mass storage device 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules can be stored on the mass storage device 504, including the operating system 505 and the content software 506. Each of the operating system 505 and the content software 506 (or some combination thereof) can comprise elements of the programming and the content software 506. The content data 507 can also be stored on the mass storage device 504. The content data 507 can be stored in any of one or more databases known in the art. Such databases comprise, DB2®, Microsoft® Access, Microsoft® SQL Server, Oracle®, mySQL, PostgreSQL, and the like. The databases can be centralized or distributed across multiple systems.

The user can enter commands and information into the computer 501 via an input device (not shown). Such input devices comprise a keyboard, pointing device (e.g., a "mouse"), a microphone, a joystick, a scanner, tactile input devices such as gloves, and other body coverings, and the like These and other input devices can be connected to the one or more processors 503 via the human machine interface 502 that is coupled to the system bus 513, but can be connected by other interface and bus structures, such as a parallel port, game port, an IEEE 1394 Port (also known as a Firewire port), a serial port, or a universal serial bus (USB).

The display device 511 can also be connected to the system bus 513 via an interface, such as the display adapter 509. It is contemplated that the computer 501 can have more than one display adapter 509 and the computer 501 can have more than one display device 511. The display device 511 can be a monitor, an LCD (Liquid Crystal Display), or a projector. In addition to the display device 511, other output peripheral devices can comprise components such as speakers (not shown) and a printer (not shown) which can be connected to the computer 501 via the Input/Output Interface 510. Any step and/or result of the methods can be output in any form to an output device. Such output can be any form of visual representation, including, but not limited to, textual, graphical, animation, audio, tactile, and the like. The display device 511 and computer 501 can be part of one device, or separate devices.

The computer 501 can operate in a networked environment using logical connections to one or more remote computing devices 514*a,b,c*. A remote computing device can be a personal computer, portable computer, smartphone, a server, a router, a network computer, a peer device or other common network node, and so on. Logical connections between the computer 501 and a remote computing device 514*a,b,c* can be made via a network 515, such as a local area network (LAN) and/or a general wide area network (WAN). Such network connections can be through the network adapter 508. The network adapter 508 can be implemented in both wired and wireless environments. Such networking environments are conventional and commonplace in dwellings, offices, enterprise-wide computer networks, intranets, and the Internet.

Application programs and other executable program components such as the operating system 505 are shown herein as discrete blocks, although it is recognized that such programs and components reside at various times in different storage components of the computing device 501, and are executed by the one or more processors 503 of the computer. An implementation of the content software 506 can be stored on or transmitted across some form of computer readable media. Any of the disclosed methods can be performed by computer readable instructions embodied on computer readable media. Computer readable media can be any available media that can be accessed by a computer. Computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

The methods and systems can employ Artificial Intelligence techniques such as machine learning and iterative learning. Such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be exemplary rather than restrictive.

Unless otherwise expressly stated, it is in no way intended that any method set forth herein be construed as requiring that its steps be performed in a specific order. Where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
based on a request for content comprising a plurality of content segments, determining, for at least one content segment of the plurality of content segments, an identifying sequence that indicates at least one variant of a plurality of variants, wherein each variant of the plurality of variants is associated with at least one encoding parameter, and wherein the at least one content segment is encoded based on the at least one encoding parameter associated with the at least one variant; and
sending, based on the identifying sequence, a manifest file configured to facilitate access to the content, wherein the manifest file indicates, based on the at least one content segment, the at least one variant.

2. The method of claim 1, wherein determining the identifying sequence comprises:
encoding, based on the at least one encoding parameter associated with the at least one variant, at least one unmarked frame of the at least one content segment.

3. The method of claim 2, wherein the at least one content segment comprises at least one marked frame comprising at least one variation associated with the at least one encoding parameter associated with the at least one variant, and wherein the at least one variation comprises:
a variation of a motion vector associated with the at least one marked frame,
a variation of a color composition associated with the at least one marked frame, or
a variation of an audio composition associated with the at least one marked frame.

4. The method of claim 2, wherein the at least one encoding parameter associated with the at least one variant comprises at least one motion vector associated with at least one macroblock of the at least one unmarked frame, and wherein encoding the at least one unmarked frame comprises: encoding, based on the at least one motion vector, the at least one macroblock of the at least one unmarked frame.

5. The method of claim 2, wherein the at least one encoding parameter associated with the at least one variant comprises at least one quantization parameter, and wherein encoding the at least one unmarked frame comprises: encoding, based on the at least one quantization parameter, the at least one unmarked frame.

6. The method of claim 1, further comprising at least one of:
receiving, from a user device, the request, wherein the identifying sequence identifies the user device; or
receiving, from a content source, the plurality of content segments, wherein the identifying sequence identifies the content source.

7. The method of claim 1, wherein sending the manifest file comprises: sending, to a user device via a communication session, the manifest file, wherein the identifying sequence identifies at least one of the user device or the communication session.

8. A method comprising:
determining, for content comprising a plurality of content segments, at least one variant of a plurality of variants associated with the plurality of content segments, wherein each variant of the plurality of variants is associated with at least one encoding parameter;
determining, for at least one content segment of the plurality of content segments, an identifying sequence that indicates the at least one variant;
encoding, based on the identifying sequence and the at least one encoding parameter associated with the at least one variant, the at least one content segment; and
sending the at least one content segment.

9. The method of claim 8, wherein encoding the at least one content segment comprises:
encoding, based on at least one quantization parameter, at least one macroblock of at least one unmarked frame of the at least one content segment, wherein the at least one encoding parameter comprises the at least one quantization parameter.

10. The method of claim 8, further comprising:
encoding, based on at least one motion vector, at least one macroblock of at least one unmarked frame of the at least one content segment, wherein the at least one encoding parameter comprises the at least one motion vector.

11. The method of claim 8, wherein the at least one content segment comprises at least one marked frame comprising at least one variation associated with the at least one encoding parameter associated with the at least one variant, and wherein the at least one variation comprises:
a variation of a motion vector associated with the at least one marked frame,
a variation of a color composition associated with the at least one marked frame, or
a variation of an audio composition associated with the at least one marked frame.

12. The method of claim 8, wherein sending the at least one content segment comprises:
sending, to a computing device, the at least one content segment; and
determining, by the computing device, a manifest file configured to facilitate access to the at least one content segment, wherein the manifest file indicates, based on the at least one content segment, the at least one variant.

13. The method of claim 8, further comprising at least one of:
receiving, from a user device, a request for the content, wherein the identifying sequence identifies at least one of: the user device or a user associated with the user device; or
receiving, from a content source, the plurality of content segments, wherein the identifying sequence identifies the content source.

14. An apparatus comprising:
at least one processor; and
memory storing processor executable instructions that, when executed by the at least one processor, cause the apparatus to:
based on a request for content comprising a plurality of content segments, determine, for at least one content segment of the plurality of content segments, an identifying sequence that indicates at least one variant of a plurality of variants, wherein each variant of the plurality of variants is associated with at least one encoding parameter, and wherein the at least one content segment is encoded based on the at least one encoding parameter associated with the at least one variant; and send, based on the identifying sequence, a manifest file configured to facilitate access to the content, wherein the manifest file indicates, based on the at least one content segment, the at least one variant.

15. The apparatus of claim 14, wherein the processor executable instructions that cause the apparatus to determine the identifying sequence further cause the apparatus to:
encode, based on the at least one encoding parameter associated with the at least one variant, at least one unmarked frame of the at least one content segment.

16. The apparatus of claim 15, wherein the at least one content segment comprises at least one marked frame comprising at least one variation associated with the at least one encoding parameter associated with the at least one variant, and wherein the at least one variation comprises:
a variation of a motion vector associated with the at least one marked frame,
a variation of a color composition associated with the at least one marked frame, or
a variation of an audio composition associated with the at least one marked frame.

17. The apparatus of claim 15, wherein the at least one encoding parameter associated with the at least one variant comprises at least one motion vector associated with at least one macroblock of the at least one unmarked frame, and wherein the processor executable instructions that cause the apparatus to encode the at least one unmarked frame further cause the apparatus to: encode, based on the at least one motion vector, the at least one macroblock of the at least one unmarked frame.

18. The apparatus of claim 15, wherein the at least one encoding parameter associated with the at least one variant comprises at least one quantization parameter, and wherein the processor executable instructions that cause the apparatus to encode the at least one unmarked frame further cause the apparatus to: encode, based on the at least one quantization parameter, the at least one unmarked frame.

19. The apparatus of claim 14, wherein the processor executable instructions further cause the apparatus to at least one of:
receive, from a user device, the request, wherein the identifying sequence identifies the user device; or
receive, from a content source, the plurality of content segments, wherein the identifying sequence identifies the content source.

20. The apparatus of claim 14, wherein the processor executable instructions that cause the apparatus to send the manifest file further cause the apparatus to: send, to a user device via a communication session, the manifest file, wherein the identifying sequence identifies at least one of the user device or the communication session.

21. An apparatus comprising:
at least one processor; and
memory storing processor executable instructions that, when executed by the at least one processor, cause the apparatus to:
determine, for content comprising a plurality of content segments, at least one variant of a plurality of variants associated with the plurality of content segments, wherein each variant of the plurality of variants is associated with at least one encoding parameter;
determine, for at least one content segment of the plurality of content segments, an identifying sequence that indicates the at least one variant;
encode, based on the identifying sequence and the at least one encoding parameter associated with the at least one variant, the at least one content segment; and
send the at least one content segment.

22. The apparatus of claim 21, wherein the processor executable instructions that cause the apparatus to encode the at least one content segment further cause the apparatus to:
encode, based on at least one quantization parameter, at least one macroblock of at least one unmarked frame of the at least one content segment, wherein the at least one encoding parameter comprises the at least one quantization parameter.

23. The apparatus of claim 21, wherein the processor executable instructions further cause the apparatus to:
encode, based on at least one motion vector, at least one macroblock of at least one unmarked frame of the at least one content segment, wherein the at least one encoding parameter comprises the at least one motion vector.

24. The apparatus of claim 21, wherein the at least one content segment comprises at least one marked frame comprising at least one variation associated with the at least one encoding parameter associated with the at least one variant, and wherein the at least one variation comprises:
a variation of a motion vector associated with the at least one marked frame,
a variation of a color composition associated with the at least one marked frame, or
a variation of an audio composition associated with the at least one marked frame.

25. The apparatus of claim 21, wherein the processor executable instructions that cause the apparatus to send the at least one content segment further cause the apparatus to:
send, to a computing device, the at least one content segment, wherein the computing device determines a manifest file configured to facilitate access to the at least one content segment, wherein the manifest file indicates, based on the at least one content segment, the at least one variant.

26. The apparatus of claim 21, wherein the processor executable instructions further cause the apparatus to at least one of:
receive, from a user device, a request for the content, wherein the identifying sequence identifies at least one of: the user device or a user associated with the user device; or
receive, from a content source, the plurality of content segments, wherein the identifying sequence identifies the content source.

* * * * *